(12) United States Patent
Hellenbrand

(10) Patent No.: US 9,617,074 B2
(45) Date of Patent: Apr. 11, 2017

(54) METHOD AND PICKING DEVICE FOR STORING A PLURALITY OF IDENTICAL PIECE GOODS

(71) Applicant: CareFusion Germany 326 GmbH, Kelberg (DE)

(72) Inventor: Christoph Hellenbrand, Kaifenheim (DE)

(73) Assignee: CareFusion Germany 326 GmbH, Kelberg (DE)

(*) Notice: Subject to any disclaimer, the term of this patent is extended or adjusted under 35 U.S.C. 154(b) by 29 days.

(21) Appl. No.: 14/847,154

(22) Filed: Sep. 8, 2015

(65) Prior Publication Data

US 2017/0066593 A1    Mar. 9, 2017

(51) Int. Cl.
G06F 7/00       (2006.01)
B65G 1/137     (2006.01)
G06Q 10/08    (2012.01)

(52) U.S. Cl.
CPC .......... B65G 1/137 (2013.01); G06Q 10/087 (2013.01)

(58) Field of Classification Search
None
See application file for complete search history.

(56) References Cited

U.S. PATENT DOCUMENTS 5,473,545 A    12/1995 Schausten
5,679,941 A *  10/1997 Iizaka ................ G07G 1/0045
                                                              235/383
2010/0126780 A1* 5/2010 Inoue ..................... G01G 13/08
                                                              177/1
2010/0242415 A1* 9/2010 Ehrat ...................... B65B 5/105
                                                              53/474
2011/0039709 A1* 2/2011 Lips .................. G01N 35/0099
                                                              506/7

(Continued)

FOREIGN PATENT DOCUMENTS

DE         102 25 332 A1    1/2004
DE    102004013353 A1    10/2005

(Continued)

OTHER PUBLICATIONS

European Extended Search Report issued Mar. 8, 2016 in EP Appln. No. 15184246.5 (11 pages).

(Continued)

Primary Examiner — Yolanda Cumbess
(74) Attorney, Agent, or Firm — McDermott Will & Emery LLP

(57) ABSTRACT

Methods and picking devices for storing a plurality of identical piece goods in the picking device in which the number of identical piece goods is automatically detected are provided. Multiple piece goods are placed in a support area of a storage device and a determination that a last piece good has been placed is made. Upon detection, the piece goods are moved into a removal area of the storage device and a gripping apparatus of an operating unit moves into the removal area, grasps the piece goods, and moves them from the removal area onto a support table of the operating unit. The number of piece goods situated in the support area is determined based on piece goods data and size data of the piece goods that are detected with a sensor system, after it has been detected that a last piece good has been placed in the support area.

20 Claims, 6 Drawing Sheets

(56) References Cited

U.S. PATENT DOCUMENTS

2012/0292156 A1* 11/2012 Buerge ................ B65H 29/003
198/460.3

FOREIGN PATENT DOCUMENTS

| | | |
|---|---|---|
| DE | 102004046176 A1 | 4/2006 |
| DE | 202006014375 U1 | 3/2008 |
| DE | 102010001569 A1 | 8/2011 |
| DE | 202012012928 U1 | 5/2014 |
| DE | 102013208561 A1 | 11/2014 |
| EP | 1 619 148 A1 | 1/2006 |
| EP | 1 627 830 A1 | 2/2006 |
| EP | 2 574 574 A1 | 4/2013 |

OTHER PUBLICATIONS

ARXRowaSpain Video: "Robot Rowa Vmax ARX-: Loading and Storage System" YouTube Mar. 11, 2011 (Mar. 11, 2011), Sides 1-1, XP054976384, Found in Internet. URL: https://www.youtube.com/watch?v=hzQSrlXR7jM [found in Feb. 19, 2016].

* cited by examiner

METHOD AND PICKING DEVICE FOR STORING A PLURALITY OF IDENTICAL PIECE GOODS

BACKGROUND

The disclosed embodiments relate to a method for storing a plurality of identical piece goods, in particular pharmaceutical packages, in a picking device, and a picking device which is suitable for carrying out the method.

In many medical treatment settings, it is desirable to provide picking device and/or a method for efficiently storing piece goods, particularly medication packages. For example, a method by which a plurality of identical piece goods may be stored in a time-saving manner and with a reduced frequency of errors, and a picking device with which such a method may be carried out.

SUMMARY

One or more disclosed embodiments provide a method for storing piece goods in a picking device. The method includes placing piece goods in a support area of a storage device and detecting that a last piece good has been placed in the support area. The method also includes after detecting that the last piece good has been placed in the support area, determining the number of piece goods situated in the support area based on piece goods data and size data of the plurality of piece goods that are detected with at least one sensor system. The method further includes moving the piece goods along a storage direction into a removal area of the storage device and moving a gripping apparatus of an operating unit into the removal area. The method also includes grasping the piece goods with the gripping apparatus and moving the piece goods from the removal area onto a support table over an end-face edge of the support table.

One or more disclosed embodiments provide a picking device for piece goods, including at least one rack row having at least one rack with a plurality of shelves disposed vertically one above the other and at least one storage device having a support area for receiving piece goods to be stored. The picking device also includes a control unit and an operator unit coupled to the control unit. The operator unit includes a support table configured to receive one or more piece goods, the support table having an end-face edge, and at least one gripping apparatus configured to grasp piece goods in a removal area of the at least one storage device and move the grasped piece goods from the storage device, over the end-face edge, onto the support table. The picking device further includes a release device coupled to the control unit and at least one sensor system coupled to the control unit, the sensor system configured to detect piece goods data and transmit the detected piece goods data to the control unit. The control unit is configured to determine the number of piece goods situated in the support area based on the piece goods data and size data of the piece goods.

One or more disclosed embodiments provide a picking device for piece goods, including a rack row having a plurality of shelves, a storage device having a support area for receiving piece goods to be stored, a control unit, and an operator unit. The operator unit includes a support table having an end-face edge and a gripping apparatus. The picking device also includes a release device and at least one sensor system. The picking device is configured to place piece goods in the support area of the storage device, detect that a last piece good has been placed in the support area, after detecting that the last piece good has been placed in the support area, determine the number of piece goods situated in the support area based on piece goods data and size data of the plurality of piece goods that are detected with the at least one sensor system, move the piece goods along a storage direction into a removal area of the storage device, move a gripping apparatus of the operator unit into the removal area, grasp the piece goods with the gripping apparatus, and move the piece goods from the removal area over the end-face edge and onto the support table.

BRIEF DESCRIPTION OF THE DRAWINGS

The devices according to the present disclosure and the methods according to the present disclosure are described in greater detail below, with reference to the appended drawings, wherein.

DETAILED DESCRIPTION

Figure 1:
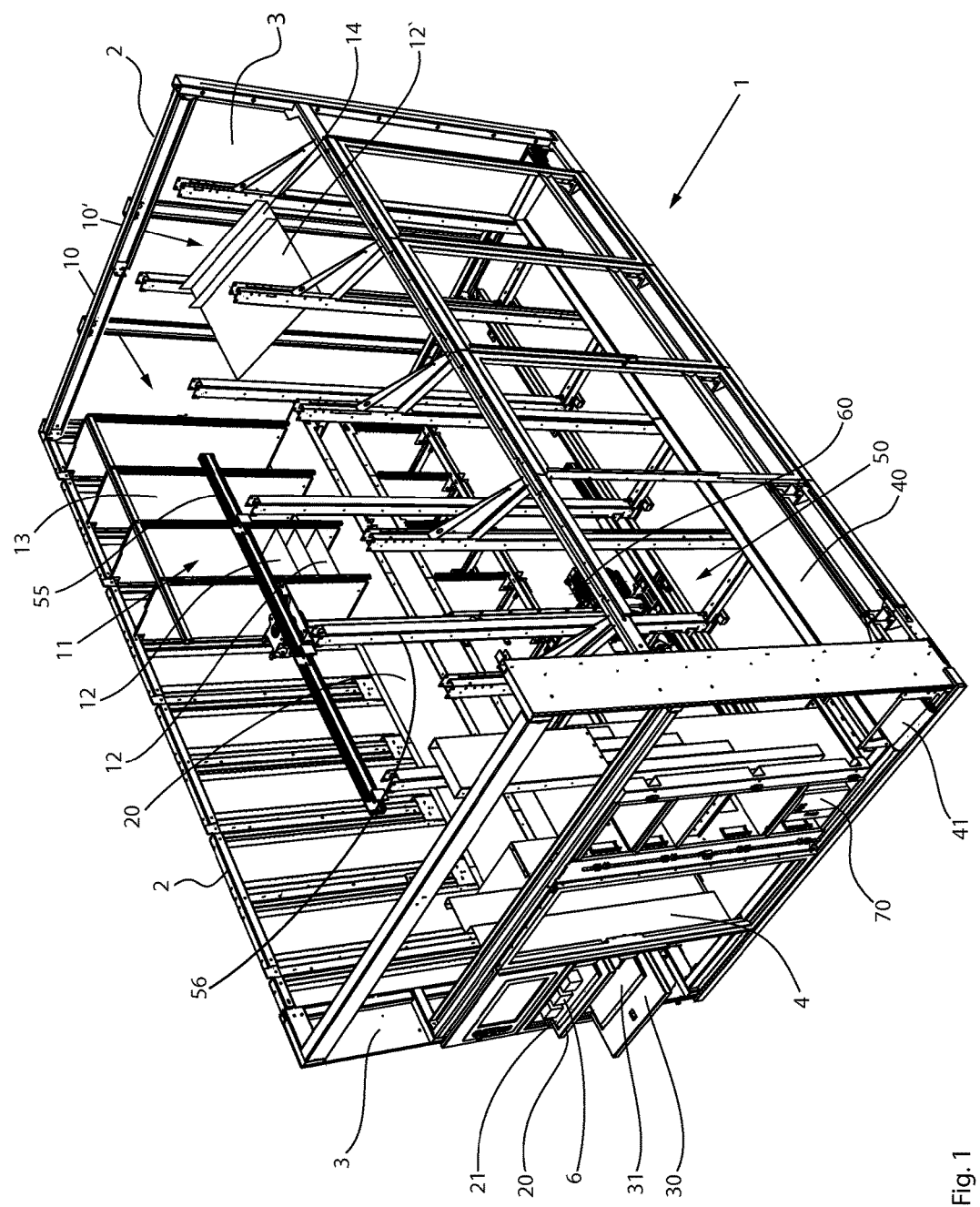
FIG. 1 is a perspective view of an embodiment of a picking device.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Automated picking devices are frequently used in pharmacies to allow space-saving storage of pharmaceutical packages. The pharmaceutical packages may be stored "chaotically" in the known picking devices that are suitable for pharmacies; i.e., the pharmaceutical packages are not stored at predetermined storage locations in the device, but, rather, at those storage locations in which just enough storage space is present. Excessive empty volume may thus be avoided, so that the number of stored pharmaceutical packages per square meter of floor space is significantly increased. Chaotic storage is routinely used for pharmaceuticals or pharmaceutical packages having a fairly low dispensing rate (e.g., so-called "slow-moving products").

For pharmaceuticals or pharmaceutical packages having a high dispensing rate, unmixed storage in chute systems is routinely used, in which a plurality of identical pharmaceutical packages is stored in typically inclined storage chutes having a release device situated at the end. If a pharmaceutical situated in a storage chute is required, it is necessary only to activate the release device in order to dispense a pharmaceutical package. If a pharmaceutical is required which is chaotically stored, it must be grasped at its storage location, using an operator unit, and retrieved. Retrieval of a chaotically stored pharmaceutical package takes more time, so that in particular for picking devices having an increased general retrieval frequency, a combination of chaotic and unmixed storage is customary.

Regardless of whether only chaotic or unmixed storage or a combination of storage types is used, it is customary to deposit multiple pharmaceutical packages of the same pharmaceutical in the picking device. In known methods, for this purpose the pharmaceutical packages are either placed individually on a storage device and successively moved into the picking device, or a plurality of identical pharmaceutical packages are deposited on a resting surface of a storage device. The number of deposited pharmaceutical packages is then manually reported to a control unit of the picking device, thus initiating the start of storage. The known methods are time-consuming (e.g., successive storage) or prone to error (e.g., provision of an incorrect number of deposited pharmaceutical packages).

A plurality of identical piece goods may be stored in a picking device. The picking device may include at least one rack row, at least one storage device, a control unit, and an operator unit coupled to the control unit. Multiple piece goods may be placed on a resting surface of a storage device, and it may be detected whether a last piece good has been placed on the resting surface. As soon as this is detected, the piece goods may be moved along a storage direction into a removal area of the storage device, the storage direction corresponding to the direction of movement of a storage device into the picking device.

When the piece goods have been placed in the removal area, a gripping apparatus of the operating unit may be moved into the removal area, allowing the gripping apparatus to access the piece goods. The piece goods may be grasped with the gripping apparatus and moved from the removal area onto a support table of the control unit over an end-face edge of the support table.

The piece goods may be removed from the storage device and stored immediately after they are moved into the picking device. However, the piece goods may also first be temporarily stored on the removal device in their respective removal areas. For example, a fairly large number of piece goods (e.g., multiple groups of piece goods that are identical in each case) may be collected on a storage device before the piece goods are moved from their respective removal area by the operator unit.

The number of piece goods situated in the support area may be determined based on piece goods data and size data of the piece goods that are detected with at least one sensor system, in particular after it has been established that a last piece good has been placed in the support area.

The piece goods data may be detected after the last piece good has been deposited, and the piece goods data may include the position and/or the size of the piece goods and the arrangement of the piece goods with respect to one another. For example, whether four piece goods are present as a combination or situated next to one another or at a distance from one another. These data may be detected using a sensor system. For example, a light grid combination or a camera system having multiple sensors.

Based on the piece goods data and the size data of the piece goods which are known to the control unit, the control unit may unambiguously detect the number of deposited piece goods independently of the type of arrangement of the piece goods with respect to one another.

Thus, it may no longer be necessary to transmit to the control unit the exact number of deposited piece goods prior to the start of storage. The storage of the piece goods may thus be accelerated and the likelihood of errors may be reduced, since manual indication of the number of piece goods to be stored may be dispensed with. Preferably, the number of piece goods is determined with an appropriate sensor system after the last piece good is deposited.

In one or more embodiments, the piece goods data may be determined by a support area sensor system associated with a support area before the piece goods are moved along the storage direction into the removal area. Such a method procedure has the advantage that the exact number of piece goods is certain at an early point in time in the storage process, and therefore enough time remains to establish the optimal method procedure (e.g., the location of the removal area, which is not a fixedly defined area, but which may be selected depending on the subsequent storage location). For example, a camera system or a light grid combination associated with a support area may be used as a support area sensor system for determining the piece goods data.

In one or more embodiments, the piece goods data may be determined by a storage sensor system associated with a storage device while the piece goods are moving along the storage direction or after the piece goods have moved into the removal area. Here, the piece goods data are detected within the device where fewer interference signals are present. The two methods mentioned above for detecting the piece goods data may be also be combined to increase the certainty in detecting the number (e.g., a discrepancy in the numbers detected by the two sensor systems then indicates an error).

In one or more embodiments, the piece goods data may be determined by a removal area sensor system associated with a removal area while the piece goods are moving onto the support table. Here, the number of piece goods is determined only relatively late in the storage process. However, in this way it may be ensured that the number of piece goods determined corresponds exactly to the number later stored. It is conceivable, for example, that during the movement of the piece goods into the removal area, a piece good shifts in such a way that it cannot be cleanly grasped by the gripping apparatus and moved onto the support table. Thus, such a piece good may not be counted. Also, a sensor system having a very simple design may be used. For example, a sensor which measures the incident quantity of light may be sufficient.

The piece goods data of the moved piece goods or a corresponding signal from the sensor system may indicate, for example, at what point in time a piece good is moved over the end-face edge of the support table. Based on the size data of the piece goods to be stored, the movement speed of the gripping apparatus or the particular instantaneous position of the motor, and the piece goods data or the corresponding signal, the control unit may determine the number of piece goods moved onto the support table. Thus, manual input of the number of the piece goods is not necessary.

The exact arrangement of the piece goods may vary. For example, the piece goods may be placed directly next to one another or any arbitrary distances between the piece goods may be present. The movement of the gripping apparatus into the removal area of the storage device may be carried out in such a way that it is ensured that all piece goods to be stored are grasped and moved onto the support table. In addition, during the movement of the piece goods from the removal area onto the support table, it is unimportant whether the exact arrangement of the piece goods is maintained, or whether the piece goods are pulled together prior to the actual movement onto the support table (e.g., gaps which may be present between the piece goods are closed during or after grasping and prior to the movement onto the support table). This is the case, for example, when the gripping apparatus includes gripper jaws where one or both gripper jaws are moved toward one another by a pivot motion in a front section, resulting in a V-shaped grip profile. During the movement of the gripping apparatus or the gripper jaws from the removal area in the direction of the support table, the piece good farthest from the end-face edge may initially be gripped or grasped and moved in the direction of the support table until the first piece good meets the second piece good, which is likewise moved along in the direction of the support table. This type of storage results in an uninterrupted sequencing of a plurality of piece goods.

In such a case, the sensor detects that only one object moves past, namely, a combination of, for example, four piece goods. In this example, having knowledge of the dimensions or the piece goods data of the piece goods, the movement speed, or the instantaneous motor position of the gripping apparatus, as well as the signal or the storage information supplied by the sensor, the control unit may unambiguously determine that the combination moved onto the support table comprises four piece goods.

To accurately calculate the number of piece goods moved, the size data (e.g., the dimensions of a single piece good) for the piece goods to be stored must be available to the control unit. If a large number of identical piece goods are to be stored, the size data for the piece goods to be stored may be detected one time prior to the storage of the large number of piece goods, and detected size data may be used during each storage operation (e.g., the size data are not renewed prior to each storage operation).

However, if new size data concerning the new piece goods to be stored are not provided when there is a change in the type of piece goods, this may result in a failure to automatically determine the number of piece goods to be stored.

The size data are customarily internally linked with identifying information concerning piece goods. This identifying information is important for the storage and the subsequent retrieval, since the control unit must unambiguously know which piece good is stored at which storage location, whether this involves chaotic storage on a shelf or unmixed storage in a storage chute. However, for strictly determining the number of piece goods, identifying information beyond the size data may not be required.

The identifying information may be applied to the piece goods themselves or to their outer packaging. However, the case may be that the identifying information that is present does not include the size data of the piece goods to be stored. For pharmaceuticals, for example, it is not yet customary for the identifying information associated with the package to contain size data concerning the package.

To avoid the above-described case of miscalculation, in one or more embodiments the control unit may be provided with identifying information prior to the movement of the piece goods. A procedure may be followed in which new identifying information is provided prior to each new storage process. However, this is not necessary when a large number of identical piece goods are to be stored. Thus, this obligation to provide new identifying information may be switched off manually or through control by the control unit.

As already noted above, the case may be that no size data are present for the piece goods to be stored (e.g., since new identifying information may possibly not include size data, and the data have not yet been entered or learned). To avoid the necessity for manually entering the size data, in one or more embodiments it is provided that prior to a new storage process, the control unit checks whether size data are present for the piece goods to be stored, and if this not the case, a user is requested to place a single piece good for which the size data are detected and the identifying information concerning the piece good are stored. After the size data are detected, the additional piece goods to be stored may be retrieved and stored. This simplifies the storage of new piece goods since the detection of the size data is automated, thus reducing the susceptibility to error.

Detection that a last piece good has been placed on a resting surface may take place, for example, by a user activating an input control (e.g., a foot pedal or a pushbutton). To further speed up and simplify the storage operation, in one or more embodiments it is provided that placing the last piece good of the plurality of piece goods to be stored initiates the storage. For this purpose, the depositing of a piece good in a detection range of a support detection sensor associated with a resting surface is detected. Thus, a further operation is no longer necessary after the last piece good is placed because depositing the last piece good in the detection range of the support detection sensor initiates the movement of the piece goods to the removal area.

If the picking device includes a support area sensor system, in one or more embodiments it is provided that the arrangement of a last piece good in a support area is determined by the support area sensor system. The sensor system is configured such that, on the one hand, the deposited piece goods are detectable, and on the other hand, a piece good is situated in a certain detection range. In that case, a sensor system for detecting the position of the piece goods relative to one another, and the position of at least one piece good in the detection range, is utilized, thus avoiding use of a second sensor system.

As previously indicated, the gripping apparatus is moved far enough into the removal area that movement of all piece goods from the removal area onto the support table is ensured. Here, it may not be just the deposition per se, but rather the exact deposition location of the last piece good that is determined and the movement of the gripping apparatus into the removal area may be controlled based on the deposition location. The deposition location may be determined by a special sensor system or a sensor system that is already present. With knowledge of the exact deposition location of the last piece good, it is thus possible to control the precise penetration depth of the gripping apparatus into the removal area. Accordingly, it may not be necessary to always move the gripping apparatus completely into the removal area, thus speeding up the movement of the piece goods from the removal area onto the support table.

A picking device according to the present disclosure may include at least one rack row having at least one rack with a plurality of shelves situated one above the other. The piece goods to be stored may be chaotically stored on these shelves, or may be stored in storage chutes formed on the shelves. The picking device may also include at least one storage device having a resting surface for receiving piece goods to be stored, these piece goods being moved into the picking device by means of the storage device after placement on the resting surface. The picking device may further include an operator unit, coupled to a control unit, with a support table for receiving one or more piece goods, the support table having an end-face edge associated with a storage device. The operator unit may also include a gripping apparatus by which piece goods may be grasped in the removal area of a storage device and moved from the storage device, over the end-face edge, onto the support table. The picking device may also include at least one sensor system, coupled to the control unit, with which piece goods data are detectable and transmittable to the control unit, the control unit being designed in such a way that the number of piece goods situated in the support area is determinable based on the piece goods data and the size data of the piece goods.

Due to using the above-mentioned sensor system with which piece goods data are detectable, the control unit, based on the signal or the piece goods data supplied by the sensor system, and optionally using additional data, is able to automatically determine the number of piece goods moved, as discussed above.

In one or more embodiments of the picking device, a sensor system may be configured as a support area sensor system, with which piece goods data of the piece goods situated in the support area are detectable.

In one or more embodiments of the picking device, a sensor system may be configured as a storage sensor system, with which piece goods data are detectable while the piece goods are moving along the storage direction or after the piece goods have moved into the removal area.

In one or more embodiments of the picking device, a sensor system may be configured as a removal area sensor system associated with a removal area, with which piece goods data are detectable while the piece goods are moving onto the support table.

A release device which, when activated, initiates storage of the piece goods may be coupled to the control unit. For example, in this storage, the piece goods are moved from the support area into the removal area by a storage device. The release device may be a foot pedal or a pushbutton, for example, which initiates the storage when activated. However, in one or more embodiments it is provided that the release device is a support detection sensor, associated with a support area of a storage device, which detects when a piece good or portion of a piece good is deposited in the detection range. Thus, after the last piece good is deposited, no further operation needs to be completed in order to initiate the storage of the deposited piece goods. The depositing of the last piece good in the detection range initiates the storage so that the storage itself may be carried out more quickly.

If the picking device includes a support area sensor system, in one or more embodiments it is provided that the release device is provided by the support area sensor system. For example, the functionality of the release device may be achieved by the support area sensor system, and thus the number of components may be reduced and the costs for the device may be lowered.

The sensor system for detecting the movement of piece goods over the end-face edge of the support table may be situated on any arbitrary component in the region of the removal area, as long as it is ensured that the movement of a piece good over the end-face edge can be detected with the sensor system. However, in one or more embodiments it is provided that the sensor system is situated at the end-face edge of the support table itself. This ensures that the sensor system is always ideally positioned with regard to the piece goods to be stored, so that it may be ensured that the sensor system is able to detect the movement of the piece goods over the end-face edge, regardless of the nature of the piece goods.

FIG. 1 shows a perspective illustration of a first embodiment of the picking device 1 according to the present disclosure. The picking device 1 includes a framework structure 2 on which a plurality of cladding elements 3 are mounted. For the sake of clarity, a number of the cladding elements 3 as well as some elements of the framework structure 2 are omitted. The picking device 1 includes a first rack row 10 having multiple racks 11, each having a plurality of shelves 12 situated one above the other and extending in a horizontal plane (only three shelves 12 are illustrated in FIG. 1, though additional shelves are situated above, beneath, and next to those illustrated). Each individual rack 11 of the first rack row 10 is formed by shelf walls 13 and a plurality of the above-mentioned shelves 12. In the embodiment shown, all end faces (loading edges) of the shelves are situated in a vertical plane, which simplifies storage and retrieval of piece goods or pharmaceutical packages to and from the shelves 12. The shelves 12 shown are configured for chaotic storage of pharmaceutical packages.

In one or more embodiments of the picking device 1, a second rack row 10' is provided opposite from the first rack row 10, which for reasons of clarity is merely indicated. Accordingly, only individual elements of the support frame for this rack row and a shelf 12' having a storage chute 14 for unmixed storage are illustrated in FIG. 1.

In one or more embodiments, the picking device 1 includes two storage devices 20, 30 that are situated one above the other and integrated into the first rack row 10, so that shelves 12 are provided above and beneath the two storage devices 20, 30. The storage devices 20, 30 protrude from the front of the picking device 1. Protruding portions of the storage devices 20, 30 include a support area 21, 31, respectively, on which pharmaceutical packages may be deposited for storage. In FIG. 1, three identical pharmaceutical packages 6 are situated in the support area 21 of the top storage device 20.

An operator unit 50, which is horizontally and vertically movable on a guide, is disposed between the illustrated first rack row 10 and the merely indicated second rack row 10', and is described in greater detail with reference to FIGS. 3 and 4. The operator unit 50 is movable along a horizontal guide 55, merely indicated, and a vertical guide 56 in a channel between the two rack rows 10, 10'.

Also situated in the picking device 1 is a retrieval device 40, which in the embodiment shown is designed as a conveyor belt and is indicated between the second rack row 10' and the right outer wall of the picking device 1, as shown in FIG. 1. Via the retrieval device 40, pharmaceutical packages 6 which are moved onto the retrieval device 40 are moved to a removal area 41 of the retrieval device 40. The pharmaceutical packages 6 may be configured to reach the retrieval device 40 by being moved onto the retrieval device 40 with the operator unit 50, for example. Optionally, an auxiliary retrieval path (not shown) may be connected in between the retrieval device 40 and the operator unit 50. At the inclined storage chutes 14, the pharmaceutical packages 6 may be easily moved onto the retrieval device 40 by activating a release device (not shown) situated at one end of a storage chute 14. In such a case, the pharmaceutical packages 6 may fall by gravity onto the retrieval device 40.

As further shown in FIG. 1, a control unit 70 may be coupled to the operator unit 50, sensors 24, 80, 81a, 81b and sensor systems 200, 250, 260, 300 (see FIGS. 2-4), the storage devices 20, 30 and the retrieval device 40. The control unit 70 may be situated in the front area of the picking device 1. A door opening 4 may be disposed in the middle of the front area of the picking device 1, through which the picking device 1 may be entered for maintenance purposes and in the event of malfunctions.

Figure 2:
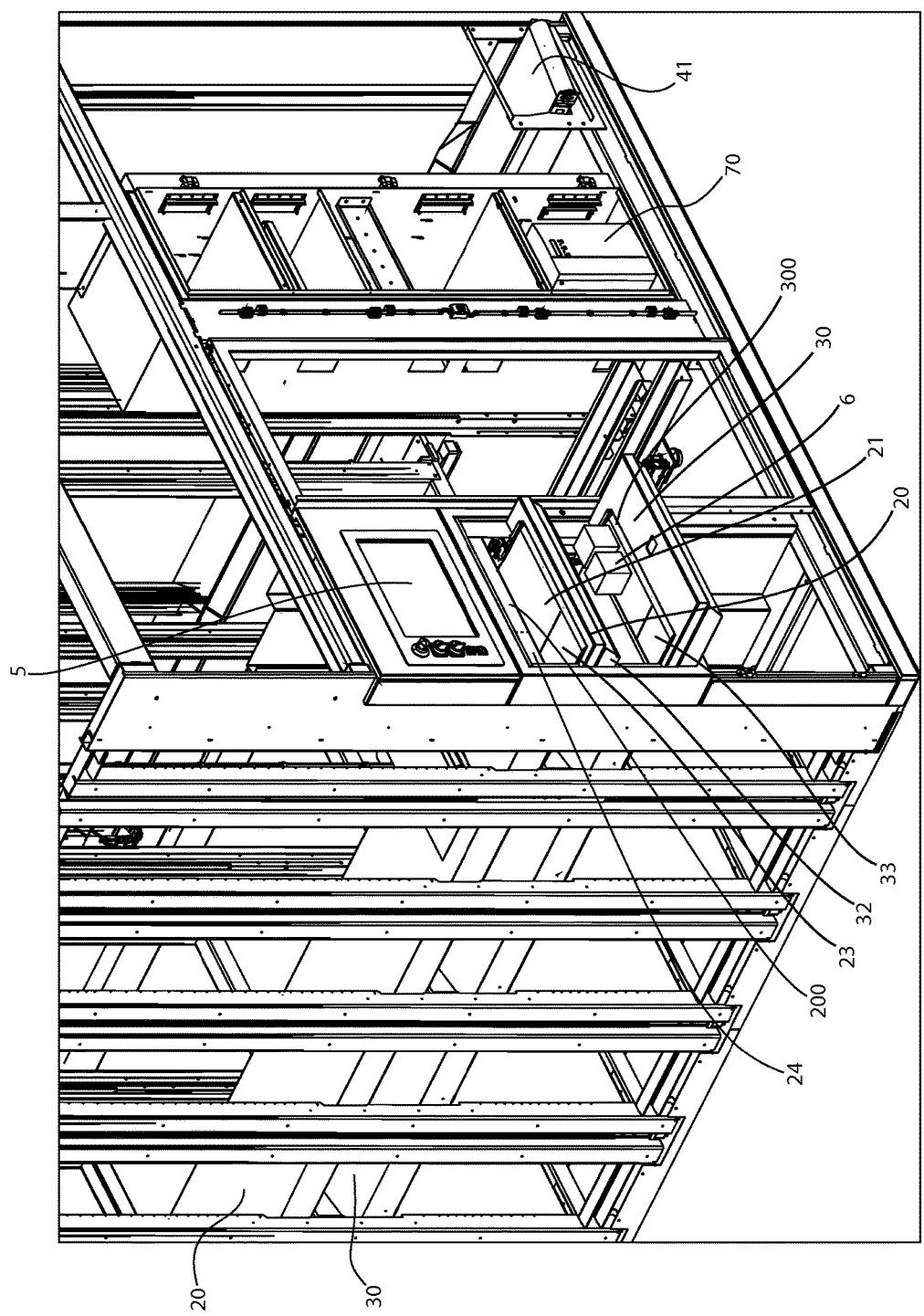
FIG. 2 is a perspective view of a portion of the picking device of FIG. 1.

FIG. 2 shows a detailed view of the front area of one or more embodiments of the picking device 1. In particular, the support area of the storage device 20, 30 is apparent. Two identical pharmaceutical packages 6 are situated in the support area 31 of the bottom storage device 30.

A support area sensor system 200, 300 is situated in each case above the support area 21, 31 of a storage device 20, 30. For example, the sensor system 200, 300 may be a light grid combination or a camera/camera combination with which piece goods data (e.g., data concerning the position of piece goods on the particular support area) may be determined. Depending on the exact configuration of the support area sensor system 200, 300, the arrangement of a pharmaceutical package 6 in a detection range 23, 33 may be detected with the support area sensor system 200, 300, and optionally with an accurate determination of the location of the package arrangement (based on the width of the storage device 20).

In the "left" area of the support area sensor system 200, a support detection sensor 24 may be provided with which the above-mentioned functions of support area sensor systems 200, 300 may be carried out. For example, in the event that no support area sensor system 200, 300 or no other support area sensor system having the above-mentioned functions is installed.

As soon as a piece good is deposited in a detection range 23, 33 or at least partially protrudes into the detection range 23, 33, an appropriate signal is transmitted to the control unit 70. The extent to which a pharmaceutical package 6 must protrude into a detection range 23, 33 in order to trigger the above-mentioned signal may be set at the control unit 70, the support detection sensor 24, or the sensor system 200, 300.

Also indicated in FIG. 2 is an input and/or output device 5 above the top storage device 20, with which information concerning the pharmaceutical packages 6 to be stored may be displayed and/or input.

Figure 3:
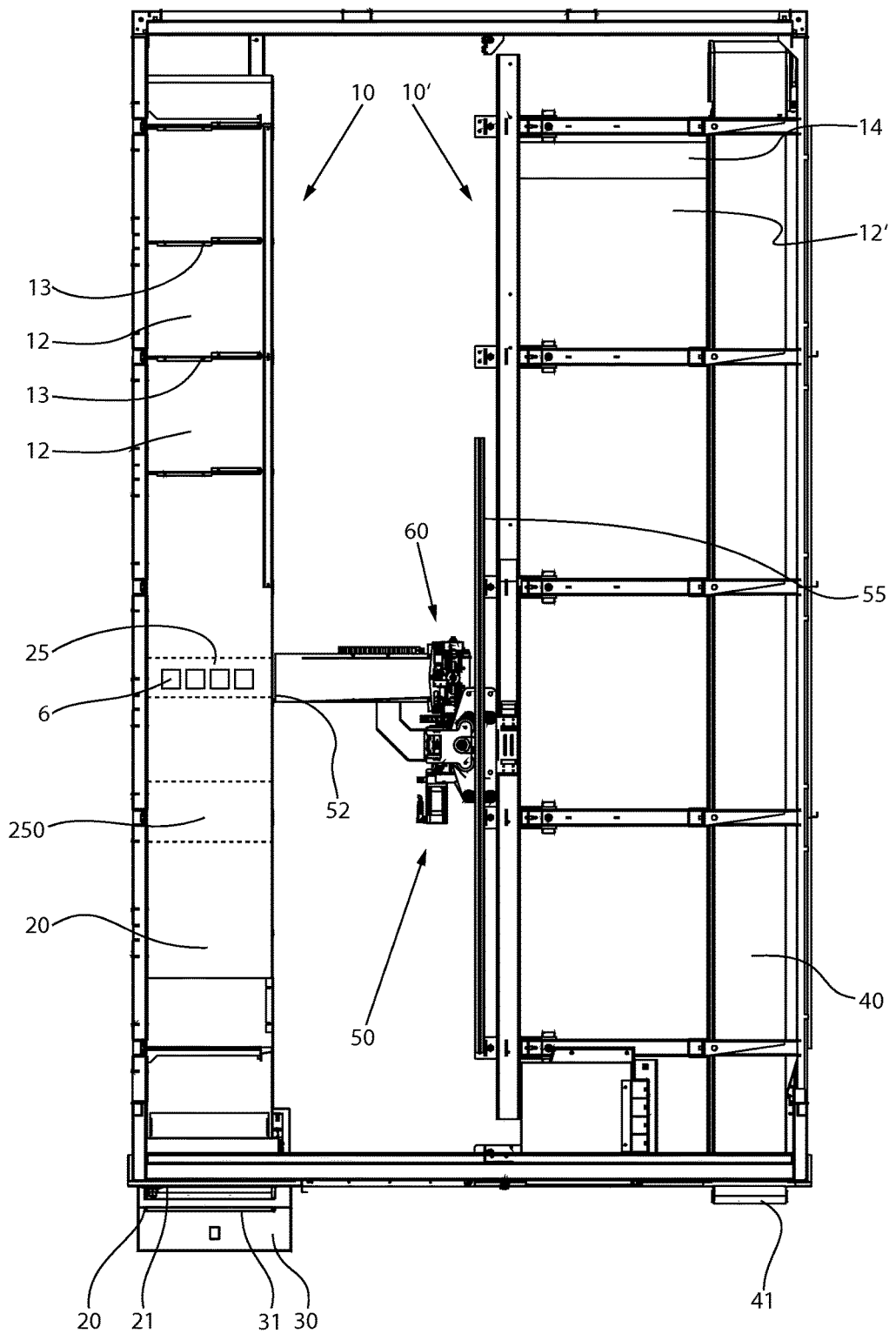
FIG. 3 is a top view of the picking device of FIG. 1.

In FIG. 3, the majority of the support frame 2 is omitted for clarity. The storage device 20, which extends from an outer region having the support area 21 to far into the picking device 1, is apparent on the left side. Four identical pharmaceutical packages 6 are shown situated in a removal area 25 of the storage device 20. In FIG. 3, it is also shown that the storage device 20 is integrated into the first rack row 10, since in the "top" area, shelves 12 and shelf walls 13 are indicated above the storage device 20. The retrieval device 40 and the removal area 41 are shown on the right side. Toward the interior of the picking device 1, the retrieval device 40 is adjoined by the second rack row 10' (merely indicated). The horizontally and vertically movable operator unit 50 is situated between the first rack row 10 and the second rack row 10'. The horizontal guide 55 may extend over the entire length of the picking device 1 to be able to reach all shelves 12 of the device with the operator unit. The operator unit 50 may include a support table 51 having an end-face edge 52, over which pharmaceutical packages 6 are pulled with a gripping apparatus 60 onto the support table 51 (see FIG. 4).

Also shown in FIG. 3 is a storage sensor system 250, disposed between the removal area 25 and the support area 21, and with which the piece goods data of piece goods moved in the storage direction toward the removal area 25 are detected. The exact configuration of the sensor system 250 depends on the particular specific requirements and structural circumstances. Thus, here as well, the sensor system 250 may use a camera system or a light grid combination. However, the sensor system 250 is not limited to the two designs mentioned above, and all sensor systems which are able to determine the required piece goods data (e.g., the exact arrangement of the piece goods) may be used.

Figure 4:
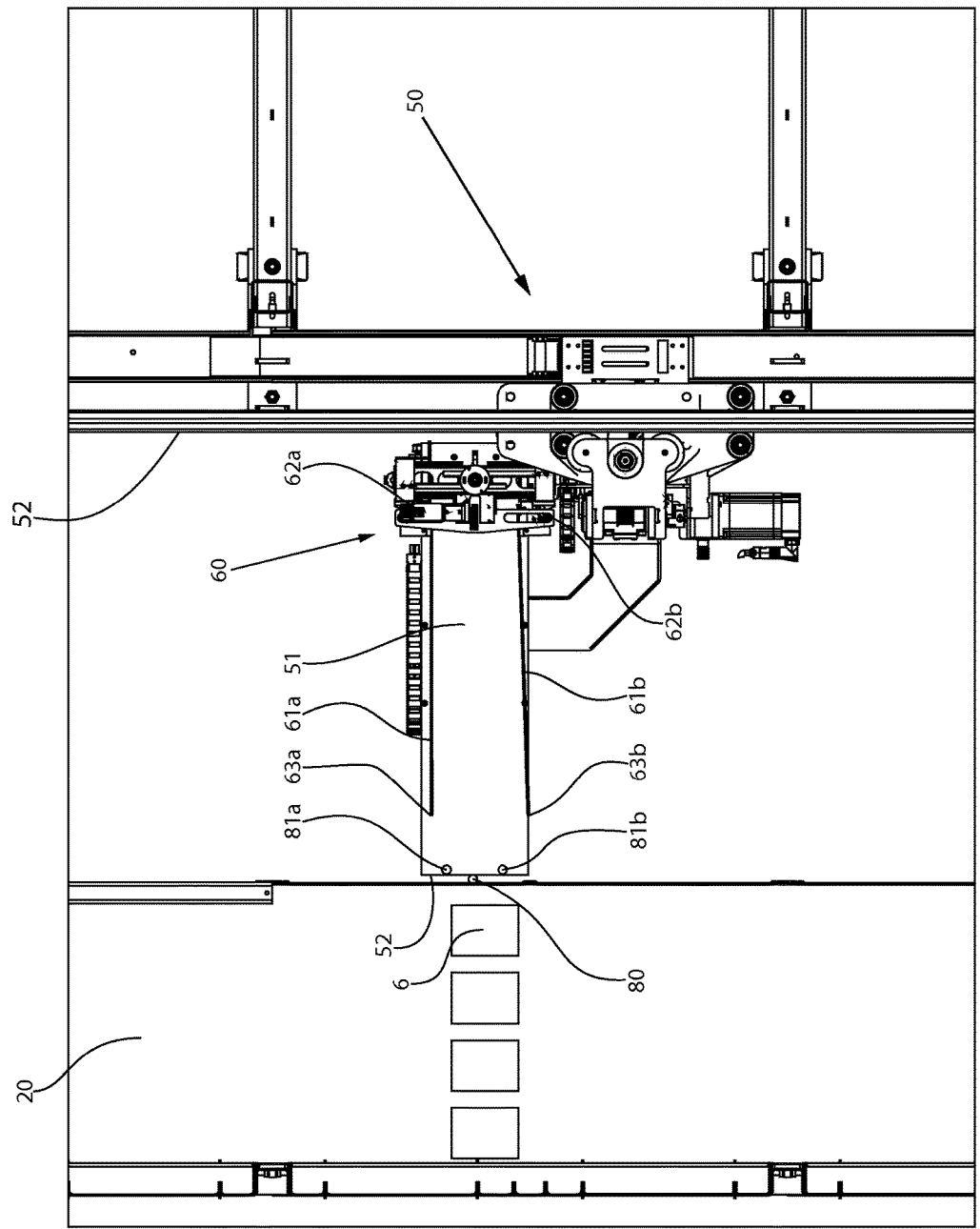
FIG. 4 is a top view of a portion of the picking device of FIG. 3.

As shown in FIG. 4, the gripping apparatus 60 of the control unit 50 may include two gripper jaws 61a, 61b, which via two pivot joints 62a, 62b may be pivotable. For example, the tips 63a, 63b of the gripper jaws 61a, 61b may be moved toward and away from one another without the base of the gripper jaws 61a, 61b being substantially moved. The entire gripping apparatus 60 may be moved above the support table 51 and into the removal area 25 of the retrieval device 40, grasping the pharmaceutical packages 6 in the removal area 25 and pulling the pharmaceutical packages 6 over the end-face edge 52 of the support table 51. The gripping apparatus 60 may also be configured to pull the pharmaceutical packages 6 over a sensor 80 situated at the removal area and/or over two sensors 81a, 81b at the end-face edge 52 of the support table 51. Thus, when the pharmaceutical packages 6 move over the sensors 80, 81a, 81b, the sensors 80, 81a, 81b generate a signal and relay it to the control unit 70. As shown in FIG. 4, one sensor 80 may be situated at the removal area 25 (e.g., at the storage device 20) and two sensors 81a, 81b may be situated at the end-face edge 52 of the support table 51. This arrangement represents one possible configuration of sensors. For example, only one sensor may be disposed at the removal area 25 or at the end-face edge 52 of the support table 51. The exact number and configuration of the sensors is not critical, but it is important that the movement of the pharmaceutical packages 6 from the removal area 25 onto the support table 51 be precisely detected by one or more sensors.

FIGS. 5a through 5e show various stages in the storage of a plurality of identical piece goods or pharmaceutical packages 6. For simplicity, only the components that are essential for the individual method steps are schematically illustrated in the above-mentioned figures.

Figure 5A:
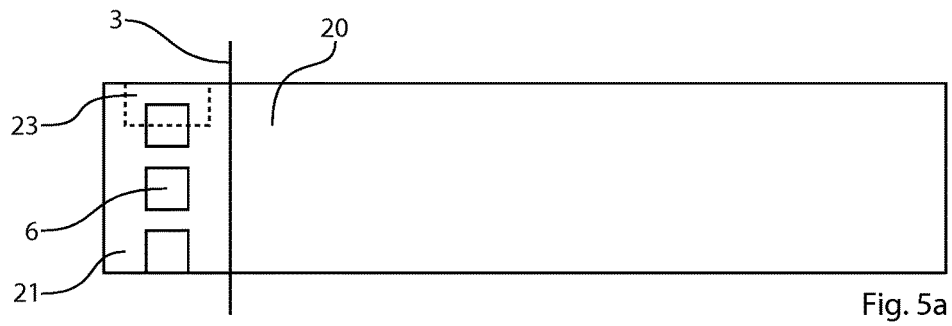
FIGS. 5a to 5e are top views of an embodiment of a picking device during various stages of a storage process.

FIG. 5a shows a storage device 20 having a support area 21 and a detection range 23 of a support detection sensor (not shown). Three identical piece goods or pharmaceutical packages 6 are situated in the support area 21 at a distance from one another, the "top" pharmaceutical package protruding into the detection range 23.

Figure 5B:
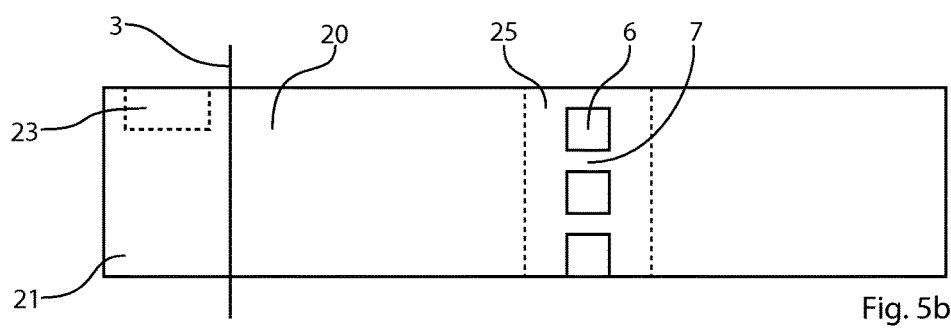

The protrusion of the top pharmaceutical package into the detection range 23 is detected by the support detection sensor (not shown) associated with the detection range 23, and is transmitted to the control unit. The piece goods or pharmaceutical packages 6 are then moved via the storage device 20 into a removal area 25, as shown in FIG. 5b.

The removal area 25 is a section within the picking device 1 which the gripping apparatus 60 accesses for moving the pharmaceutical packages 6 from a storage device 20 onto the support table 51 of the control unit 70, in that the gripping apparatus 60 is moved into this removal area 25. The removal area 25 is not a "stationary" area within the picking device 1, and instead may vary depending on the position of the control unit 70 or the deposition location of the piece goods to be stored, for example.

As previously indicated, the gripping apparatus 60 may have two gripping or clamping jaws 61a, 61b which may be pivotable, for example. As another example, the two gripper jaws 61a, 61b may be configured to be movable in parallel toward one another, and for the pharmaceutical packages 6 to be clamped or gripped by moving one or two gripper jaws 61a, 61b.

Figure 5C:
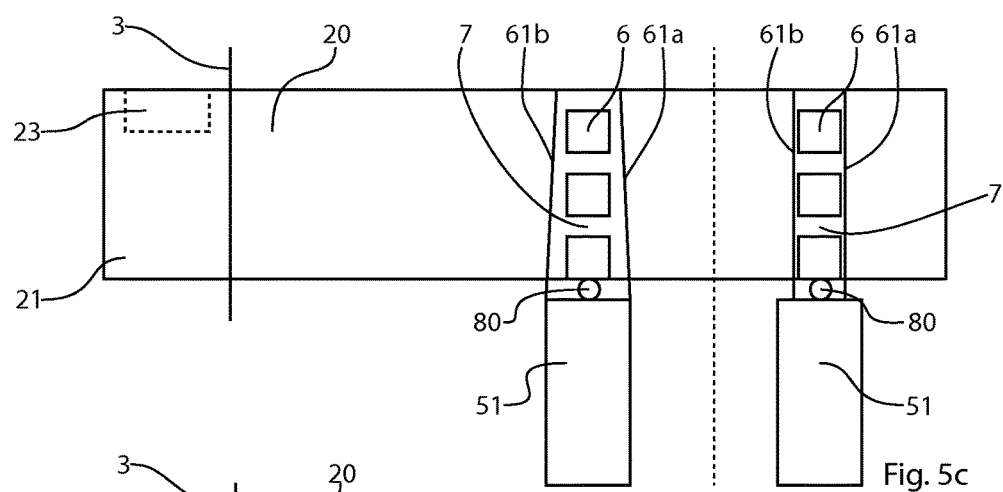

In FIG. 5c, the two above-mentioned variants, namely, the pivotable gripper jaws 61a, 61b and the gripper jaws 61a, 61b which are movable in parallel, are both shown. In each case, the illustrated gripper jaws 61a, 61b have not yet completely closed (e.g., the pharmaceutical package(s) 6 has/have not yet been grasped). Regardless of the type of gripper jaws 61a, 61b used, a clearance 7 is present between the pharmaceutical packages 6 (situated as in this example). However, the pharmaceutical packages 6 may be situated on the support area 21, without a clearance, between the gripper jaws 61a, 61b as a combination of multiple pharmaceutical packages 6. A sensor 80 configured to detect a movement of the piece goods onto the support table 51 may be associated with the removal area 25. When the pharmaceutical packages move over the sensor 80, the sensor 80 may generate a signal (or a change in signal) that may be relayed to the control unit 70. Based on this signal or the position information of the pharmaceutical packages 6 corresponding to this signal, the control unit 70 may determine the number of pharmaceutical packages 6 moved, using additional data (see FIGS. 7a, 7b).

Figure 5D:
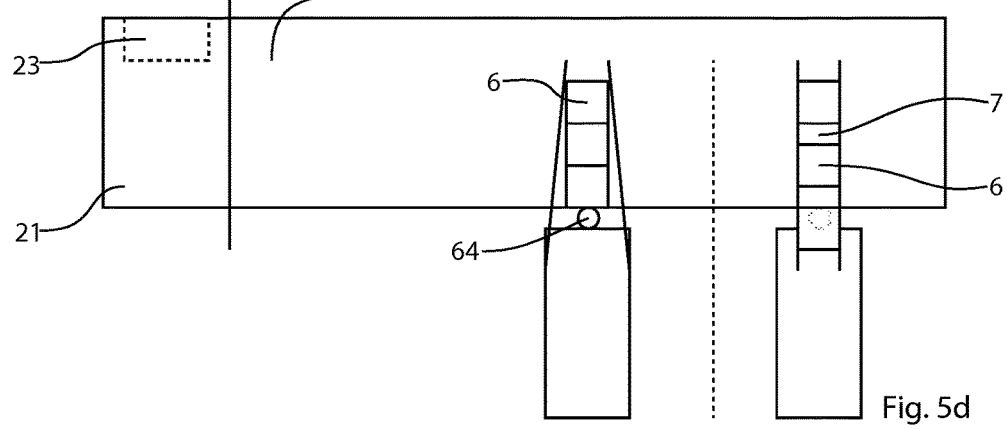

Starting from the illustration in FIG. 5c, the gripper jaws 61a, 61b of the gripping apparatus 60 may be closed until the "top" pharmaceutical package 6 in the left illustration, and all of the pharmaceutical packages 6 in the right illustration, is/are clamped or gripped. If, as indicated in FIG. 5d, the pharmaceutical packages 6 are now moved in the direction of the support table 51, via the pivotable gripper jaws 61a, 61b (e.g., left portion of FIG. 5d), initially only the "top" pharmaceutical package 6 may be moved such that the clearance 7 between the "top" and the "middle" pharmaceutical package may be eliminated. The combination of the "top" two pharmaceutical packages may then be moved to the "bottom" pharmaceutical package upon further movement of the gripper jaws 61a, 61b toward the support table 51, resulting in a combination of three pharmaceutical packages 6 with no space in between.

The situation is different for the pharmaceutical packages 6 which have been grasped by the gripping apparatus having the gripper jaws 61a, 61b which are movable in parallel (e.g., right portion of FIG. 5d). Due to the parallel movement of one or both gripper jaws 61a, 61b, all pharmaceutical packages 6, which have the same dimensions because they are identical, are grasped at the same time, so that no shifting of the pharmaceutical packages 6 toward one another takes place while the gripper jaws 61a, 61b move toward the support table 51 (e.g., the clearances 7 between the pharmaceutical packages 6 are maintained).

Figure 5E:
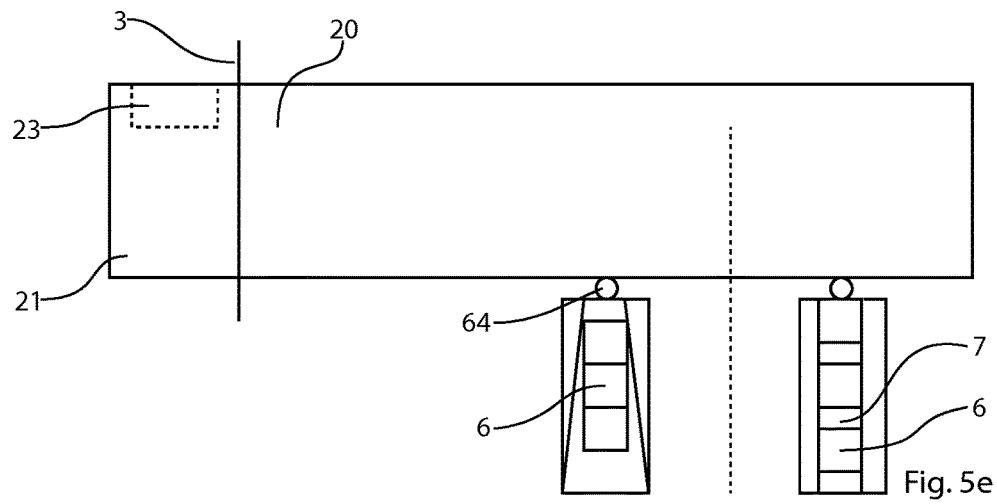

The result of the gripping movement is shown in FIG. 5e. In the left illustration with the pivotable gripper jaws 61a, 61b, the three pharmaceutical packages 6 are moved as a combination, with no space in between, onto the support table 51. In the right illustration with the gripper jaws 61a, 61b that are movable in parallel, the pharmaceutical packages 6 are moved onto the support table 51 corresponding to their original resting position (e.g., a clearance 7 is still present between the pharmaceutical packages 6).

Figure 6:
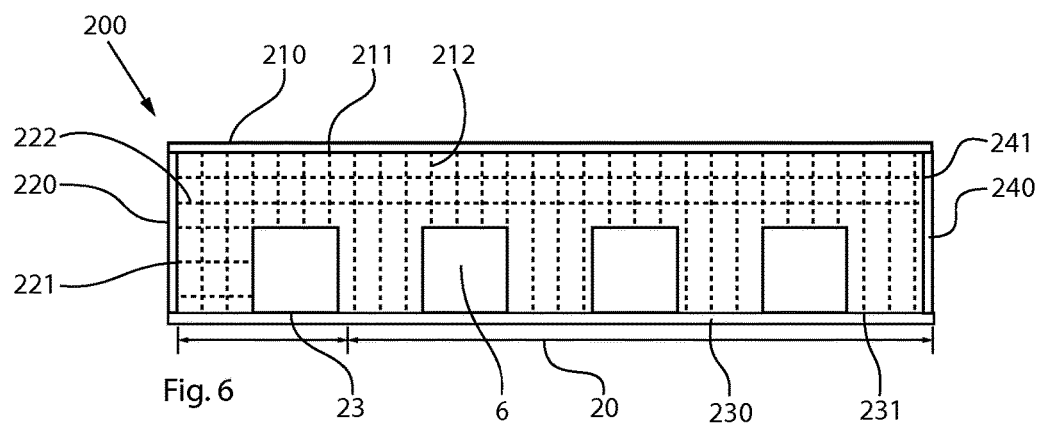
FIG. 6 is a side view of an embodiment of a sensor system.

FIG. 6 shows an example of a sensor system which may be used as a support area sensor system (e.g., sensor system 200, 300) or a storage sensor system (e.g., sensor system 250). Here, sensor system 200 is illustrated, for example. The sensor system 200 may be a light grid or a combination of two light grids 210, 230 and 220, 240. For example, a horizontal light grid 210, 230 may have a plurality of light sources 211 and receivers 231, and a vertical light grid 220, 240 likewise may have a plurality of light sources 221 and receivers 241. Light beams 212, 222 may be emitted from the light sources 211, 221 and received at the receivers 231, 241. The piece goods data may be determined based on which light beams 212, 222 reach a receiver 231, 241.

As shown in FIG. 6, the light grids 210, 230 and 220, 240 appear to be situated at the same height relative to the direction of movement of the piece goods, but in practical terms this is not the case. The light grids 210, 230 and 220, 240 are spaced at least far enough apart that the light beams 212, 222 of the grids 210, 230 and 220, 240 do not have an interfering effect.

As another example, a sensor system may be achieved by a camera system (not shown), wherein the data (images) detected by the camera system undergo image processing which provides the necessary piece goods data.

Figure 7A:
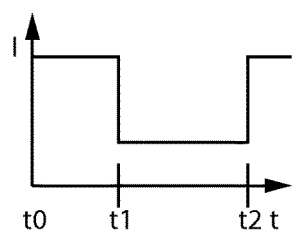
FIGS. 7a and 7b are schematic diagrams of the signals of a sensor during movement of piece goods over the sensor.
Figure 7B:
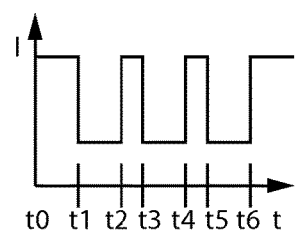

FIGS. 7a and 7b depict the signal supplied by the sensor 80 as a function of the movement of the pharmaceutical packages 6 onto the support table 51. Here, the X axis shows the time axis t, beginning with t0, and the Y axis shows the signal intensity I. For example, the sensor 80 may measure the intensity of the light striking it. Different sensors, for example contact sensors, may be used instead.

FIG. 7a depicts the movement of the combination of three pharmaceutical packages 6 over the sensor 80. It is apparent that the intensity of the light detected by the sensor 80 decreases at a point in time t1 and once again increases at a point in time t2. The control unit 70 is able to automatically determine the number of pharmaceutical packages 6 moved, based on the time period $\Delta t12$ (t2−t1), the number of changes in signal (e.g., position information of the pharmaceutical packages 6), the movement speed of the gripper jaws 61a, 61b, and the identifying information concerning the pharmaceutical packages 6.

In FIG. 7a, a change in intensity has been determined only for a time interval t1/t2, and based on the additional information it may be determined that three pharmaceutical packages 6 have been moved onto the support table 51. The situation is different when the pharmaceutical packages 6 have not pushed or pulled together to form a combination, but, rather, are moved over the sensor with clearances 7 between the pharmaceutical packages 6, as depicted in FIG. 7b. Here, a decrease in the light intensity is detected at three points in time t2, t4, t6, and an increase in the light intensity is detected at three points in time t1, t3, t5, wherein the period of the decreased light intensity corresponds to a movement of a pharmaceutical package over a sensor. The number of pharmaceutical packages 6 may be unambiguously determined based on this information $\Delta t12$ (t2−t1), $\Delta t34$ (t4−t3), and $\Delta t56$ (t6−t5), the movement speed of the gripper jaws 61a, 61 b, and the identifying information concerning the pharmaceutical packages 6.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way.

The invention claimed is:

1. A method for storing piece goods in a picking device, the method comprising:
   placing piece goods in a support area of a storage device;
   detecting that a last piece good has been placed in the support area;
   after detecting that the last piece good has been placed in the support area, determining the number of piece goods situated in the support area based on piece goods data and size data of the plurality of piece goods that are detected with at least one sensor system;
   moving the piece goods along a storage direction into a removal area of the storage device;
   moving a gripping apparatus of an operating unit into the removal area;
   grasping the piece goods with the gripping apparatus; and
   moving the piece goods from the removal area onto a support table over an end-face edge of the support table.

2. The method of claim 1, wherein the piece goods data are determined by a support area sensor system associated with a support area before the piece goods are moved along the storage direction into the removal area.

3. The method of claim 2, wherein the detecting of the placement of the last piece good in the support area is determined by the support area sensor system.

4. The method of claim 1, wherein the piece goods data are determined by a storage sensor system associated with a storage device while the piece goods are moving along the storage direction or after the piece goods have moved into the removal area.

5. The method of claim 1, wherein the piece goods data are determined by a removal area sensor system associated with a removal area while the piece goods are moving onto the support table.

6. The method of claim 1, further comprising:
transmitting identifying information to a control unit before piece goods are placed in the support area.

7. The method of claim 6, further comprising:
checking, by the control unit, whether size data are present for the piece goods to be stored; and
if size data are not present, requesting a user to place a single piece good having detected size data and stored identifying information concerning the piece good in the support area.

8. The method of claim 1, wherein the placement of a last piece good in a support area is detected by detecting the placement of a piece good in a detection range of a support detection sensor associated with the support area.

9. The method of claim 1, further comprising:
determining a placement location of the last piece good, wherein the movement of the gripping apparatus into the removal area is controlled based on the placement location.

10. A picking device for piece goods, comprising:
at least one rack row having at least one rack with a plurality of shelves disposed vertically one above the other;
at least one storage device having a support area for receiving piece goods to be stored;
a control unit;
an operator unit coupled to the control unit, the operator unit comprising:
a support table configured to receive one or more piece goods, the support table having an end-face edge; and
at least one gripping apparatus configured to grasp piece goods in a removal area of the at least one storage device and move the grasped piece goods from the storage device, over the end-face edge, onto the support table;
a release device coupled to the control unit; and
at least one sensor system coupled to the control unit, the sensor system configured to detect piece goods data and transmit the detected piece goods data to the control unit,
wherein the control unit is configured to determine the number of piece goods situated in the support area based on the piece goods data and size data of the piece goods.

11. The picking device of claim 10, wherein the sensor system comprises a support area sensor system configured to detect piece goods data of the piece goods situated in the support area.

12. The picking device of claim 11, wherein the support area sensor system comprises the release device.

13. The picking device of claim 10, wherein the sensor system comprises a storage sensor system configured to detect piece goods data while the piece goods are moving along the storage direction or after the piece goods have moved into the removal area.

14. The picking device of claim 10, wherein the sensor system comprises a removal area sensor system associated with a removal area, the removal area sensor system configured to determine piece goods data while the piece goods are moving onto the support table.

15. The picking device of claim 14, wherein the removal area sensor system is disposed at the end-face edge of the support table.

16. The picking device of claim 10, wherein the release device comprises a support detection sensor associated with a support area of a storage device, the support detection sensor configured to detect when a piece good or a portion of a piece good is situated in a detection range of the support area.

17. A picking device for piece goods, comprising:
a rack row having a plurality of shelves;
a storage device having a support area for receiving piece goods to be stored;
a control unit;
an operator unit comprising:
a support table having an end-face edge; and
a gripping apparatus;
a release device; and
at least one sensor system, wherein the picking device is configured to:
place piece goods in the support area of the storage device;
detect that a last piece good has been placed in the support area;
after detecting that the last piece good has been placed in the support area, determine the number of piece goods situated in the support area based on piece goods data and size data of the plurality of piece goods that are detected with the at least one sensor system;
move the piece goods along a storage direction into a removal area of the storage device;
move a gripping apparatus of the operator unit into the removal area;
grasp the piece goods with the gripping apparatus; and
move the piece goods from the removal area over the end-face edge and onto the support table.

18. The picking device of claim 17, further comprising a support area sensor system associated with the support area, wherein the piece goods data are determined by the support area sensor system before the piece goods are moved along the storage direction into the removal area.

19. The picking device of claim 17, further comprising a storage sensor system associated with the storage device, wherein the piece goods data are determined by the storage sensor system while the piece goods are moving along the storage direction or after the piece goods have moved into the removal area.

20. The picking device of claim 17, further comprising a removal area sensor system associated with the removal area, wherein the piece goods data are determined by the removal area sensor system while the piece goods are moving onto the support table.

* * * * *